3,171,850
PRODUCTION OF HYDROCARBON COMPOUNDS OF GROUP II-B METALS

Warren E. Becker and Paul Kobetz, Baton Rouge, La., assignors to Ethyl Corporation, New York, N.Y., a corporation of Virginia
No Drawing. Filed Mar. 30, 1961, Ser. No. 99,362
16 Claims. (Cl. 260—429.9)

The present invention is concerned with a novel method for the production of organometallic compounds, especially organometallic compounds of the Group II-B metals.

The prior art has shown various methods for the production of the organometallic compounds of the Group II-B metals, especially zinc and cadmium. The most prevalent procedures heretofore employed have included the reaction of a Group II-B metal halide with a Grignard reagent or the reaction of a Group II-B metal, or an alloy thereof, with an alkyl halide. These procedures exhibit certain inherent disadvantages which have limited their usage to laboratory purposes. By way of example, the Grignard reaction results in only moderate yields and the process inherently requires ether solutions. The reaction of the metal or alloys thereof likewise is disadvantageous because of the slowness of the reactions, low yields obtained, and the necessity of handling the more hazardous alkyl halide materials. Even further, this process suffers the disadvantage of producing alkyl metal halides as by-products in considerable amount unless strict control is employed. In view of the deficiencies of the previously known methods for preparing organo Group II-B metal compounds, especially of zinc and cadmium, it is readily apparent why these products have not been employed on a commercial scale. Therefore, it is desirable to provide a more efficient process for the production of these compounds readily adaptable to commercial operations so that their many and diverse uses as chemical tools can indeed be realized in a practical manner.

An object of this invention is to provide a new and more efficient method for the production of the organo Group II-B metal compounds. A further object is to provide the organo Group II-B metal compounds by a more simplified process resulting in these products being obtained in higher yield and purity than heretofore available. A still further object is to provide a simplified and more effective procedure for the production of the alkyl zinc compounds, especially diethyl zinc.

The above and other objects of the invention are accomplished by reacting an alkali metal organo Group II-B metal compound with a Group II-B metal salt, especially, though not necessarily, wherein the Group II-B metal of both reagents is the same and wherein said Group II-B metals have an atomic number from 30 to 48 inclusive. Of the alkali metal organo Group II-B metal compounds, the alkali metal trialkyl zinc compounds, especially those of sodium, are preferred and of the Group II-B metal salts, the halides, especially zinc chloride, are preferred. For best results, the reaction is conducted at temperatures between about 60 to 120° C. As will be brought forth in more detail hereinafter, further advantage is obtained when the reaction is conducted in the presence of diluents, particularly the polyethers of which the dimethyl ether of diethylene glycol comprises an especially preferred embodiment. Further, for the most efficient production of the desired organo Group II-B metal compound, at least 2 moles of the alkil metal organo Group II-B metal compound per mole of the Group II-B metal salt is employed. Thus, a particular embodiment of this invention comprises the reaction of essentially 2 moles of sodium triethyl zinc with one mole of zinc chloride in the presence of the dimethyl ether of diethylene glycol at a temperature between about 60 to 120° C. to produce diethyl zinc. Other embodiments of the invention include cyclic and regenerative operations for the production of the alkali metal organo Group II-B metal compounds employed as starting reagents which will be illustrated more fully hereinafter. Still further embodiments of the invention will be evident as the discussion proceeds.

The novel process is of particular advantage in providing the organo Group II-B metal compounds in higher yield and purity than heretofore available. By way of example, by reacting sodium triethyl zinc with zinc chloride, the sole products are diethyl zinc and sodium chloride. The latter is readily removed from the reaction system providing diethyl zinc in a high state of purity. Further, for every two moles of sodium triethyl zinc employed, three moles of diethyl zinc are obtained, two of which are readily recycled for regeneration of the sodium triethyl zinc by reaction with sodium hydride and ethylene either in situ or sequentially. Likewise, the reaction proceeds at moderate conditions very rapidly permitting good production per unit time with a minimum of handling and purification steps. Further, the process provides a technique that does not require extremely close control in addition to not requiring the difficult handling of materials as well as difficulty separated by-products involved in the prior art methods. These and other advantages will be evident as the discussion proceeds.

In general, any Group II-B metal salt compound wherein the metal has an atomic number between 30 and 48 inclusive which is reactive with the alkali metal organo Group II-B metal compound is employable in the process of this invention. Such Group II-B metal salt compounds can generally be classed as salts and oxides and, thus, for simplicity the term "salts" is also intended to include the oxides. The salts include both those of inorganic and organic acids. While organic acids are generally considered as having a carboxylic grouping, it is to be understood that organic compounds not having such groupings, but having strongly acidic hydrogen which form salts with zinc or cadmium are equally applicable as, for example, the alcohols and phenols. Thus, among the Group II-B metal salt reactants are included their salts of inorganic acids as, for example, the zinc and cadmium chlorides, bromides, iodides, and sulfides. Other zinc and cadmium salts of inorganic acids are those which can be termed as salts of complex inorganic acids containing a chalkogen, namely oxygen or sulfur. By the term complex inorganic acid is intended those inorganic acids which contain at least one of the elements oxygen or sulfur in the anion and additionally contain therein another and different element of the Groups III through VI of the Periodic Chart of the Elements capable of forming complex ions with oxygen or sulfur. The non-metallic elements capable of forming complex ions with oxygen or sulfur of the Groups III-A, IV-A, V-A, and VI-A are particularly preferred. Such include boron, nitrogen, silicon, phosphorous, arsenic, selenium, and tellurium. Included among the preferred anions of the complex inorganic acids are those wherein both oxygen and sulfur comprise the anion, e.g. the sulfate anion. Thus, typical examples of such salts include the zinc and cadmium sulfates, sulfonates, sulfinates, carbonates, nitrates, phosphates (both ortho and meta), pyrophosphates, persulfates, silicates, cyanates, thiocyanates, dithionates, borates (both ortho and meta), selenates, the various arsenates, and the like. Other zinc and cadmium salts which can be employed include, for example, those in which the anion comprises, in addition to the oxygen or sulfur, certain metals such as those of Groups III-B through VI-B and III-A through V-A, for example, zinc antimonate, tungstate, chromate, zirconate, molybdate, and the like.

Typical examples of the oxides employable in the process include red zinc ore (zinc oxide); and the like ores of cadmium. Also employable are the organo Group II–B metal salts (RMX) wherein R is an organo radical, especially hydrocarbon, M is zinc or cadmium, and X is an anion, particularly halogen. Examples of such reagents are ethyl-, propyl-, phenylzinc or cadmium chloride, bromide, and the like.

The salts of the organic acids can be further defined as such wherein the zinc or cadmium is attached to at least one carbon-containing organic radical through an intermediate atom of oxygen or sulfur. For practical reasons, the hydrocarbon portions of such acids will generally contain not more than about 25 carbon atoms, even though higher molecular weight materils can be employed. Illustrative examples of the zinc and cadmium salts of organic acids include zinc formate, zinc diacetate, zinc propanoate, zinc butanoate, zinc octanoate, zinc myristate, zinc octadecanoate, zinc linoleoate, zinc butyrate, zinc ethylate, zinc phenolate, zinc benzoate, zinc thiophenolate, zinc napthenate, zinc thioacetate, zinc isobutyrate, zinc propiolate, and the like and corresponding compounds of cadmium. It is to be understood that the hydrocarbon portions of such organic acid salts can be further substituted to result in branched chain isomers or substituted with functional groups such as the amino, nitro, keto, and the like groups, provided such are essentially inert in the reaction. The zinc salts of the lower alkanoic acids, especially those having up to about 8 carbon atoms in the hydrocarbon portions, are preferred salts of organic acids because of their greater availability, economy, solubility in the reaction system, and higher yields obtained.

The above grouping of the Group II–B metal salts or oxides is not intended to indicate that the various classes or members of the classes are equivalent type materials since some exhibit particular and unique advantage over others. For example, in certain instances, zinc or cadmium reactants which are completely miscible in the reaction system are preferred. Likewise, of the zinc and cadmium halide reactants, the chlorides comprise a preferred embodiment. Of the Group II–B metal salts of complex inorganic acids, zinc or cadmium sulfate comprise a preferred embodiment and of the zinc or cadmium salts of organic acids, those of the lower alkanoic acids having up to about 8 carbon atoms in the hydrocarbon portion, especially zinc diacetate, are preferred. Zinc and cadmium chloride, especially the former, are preferred over the zinc and cadmium salts of organic acids and salts of other inorganic acids, since higher yields are obtained. On the other hand, the zinc and cadmium oxides, especially zinc oxide, are sometimes preferred even though they are less reactive because of their greater availability and economy. Likewise, of the aforementioned zinc and cadmium compounds, those of zinc are preferred over the corresponding and other cadmium compounds because of their greater utility in the process, economy, and the more advantageous use to which the products obtained are applicable.

The alkali metal organo Group II–B reactant is a compound in which the Group II–B metal is also one having an atomic number between about 30 and 48 inclusive. While in general such compounds need have only one carbon to metal bonding, in order to achieve the particular and most practical benefits of this invention, they will contain in addition to the alkali metal and the organo Group II–B metal, only organo groups, preferably hydrocarbon. Thus, another way of defining this particular reagent is that it is an alkali metal triorgano zinc or cadmium compound. The organo groups can be the same or different. When the organo groups are different, of course, the resulting products will have mixed organo groups contained therein. For practical purposes, however, it is preferred that the organo groups be the same. Thus, typical examples of the alkali metal organo Group II–B metal reagent include sodium trimethyl zinc, sodium triethyl zinc, sodium tri-n-propyl zinc, sodium tri-n-butyl zinc, sodium tri-3-hexenyl zinc, sodium tri-3-hexynyl zinc, sodium tricyclohexyl zinc, sodium tricyclopentyl zinc, sodium triphenyl zinc, sodium tribenzyl zinc, sodium tritolyl zinc, sodium trinaphthyl zinc, sodium n-propyl diethyl zinc, sodium ethyl diphenyl zinc, sodium methyl diethyl zinc, and the like and other such compounds wherein cadmium is substituted for zinc and the other alkali metals as, for example, lithium, potassium, rubidium, or cesium are substituted for sodium. It is to be understood that the hydrocarbon moieties of such alkali metal organo Group II–B metal compounds can be further substituted with groups which are essentially inert to the reactants or products as, for example, branched chains, the amino groups, the halogens, carbonyl groups, and the like. It is preferred, however, that the organo groups be hydrocarbon. In a particularly preferred embodiment, the alkali metal trialkyl Group II–B metal compounds are employed wherein the alkyl groups are identical and each contain up to and including about 10 carbon atoms. Such materials are more easily obtained, of greater reactivity, and the products produced are of more practical utility. Such alkali metal trialkyl Group II–B metal compounds wherein the alkali metal is sodium and the Group II–B metal is zinc, e.g., sodium triethyl zinc, are more especially preferred because of their greater economy and availability of sodium and zinc. It is to be understood that this reactant is employable in the form of its complexes with various complexing organic solvents, especially the Lewis bases such as the polyethers as described hereinafter. The Lewis base complexes are of greater stability as well as greater reactivity than the alkali metal organo Group II–B metal compounds not so complexed. For example, the dimethyl ether of diethylene glycol is a particularly effective complexing solvent.

While, in general, one need not employ a Group II–B metal salt or oxide which has the same metal as the Group II–B metal of the alkali metal organo Group II–B reactant, it is preferred that such be the case in order to realize the most effective benefits of the process of this invention. By way of example, one can react sodium triethyl zinc with cadmium chloride to produce, as the reaction product, a mixture of diethyl zinc and diethyl cadmium in a ratio of 2:1 moles, respectively, along with by-product sodium chloride. After filtration of the by-product sodium chloride, the zinc and cadmium alkyls can be separated by suitable means, such as distillation or the like. However, when both reactants are of the same Group II–B metal, more simplified processing, along with avoidance of the necessity of complicated separation techniques, is possible and therefore such comprises a particularly preferred embodiment.

The proportions of the reactants employable in the present invention are subject to considerable latitude. Thus, in general, an excess of either reactant can be employed. However, for best results, it is preferred to employ a ratio of at least 2 moles of the alkali metal organo Group II–B metal compound per mole of the Group II–B metal salt compound. In a particularly preferred embodiment, essentially 2 moles of the alkali metal organo Group II–B metal compound per mole of the Group II–B salt compound is employed. Thus, the process of this invention is illustrated by the following chemical reaction of a particularly preferred embodiment:

$$2NaZn(C_2H_5)_3 + ZnCl_2 \rightarrow 3(C_2H_5)_2Zn + 2NaCl$$

Generally, the Group II–B metal salt compound will be solid in the reaction system since most of such are insoluble in the organic solvents, when employed. The particle size of this reagent is not critical since lumps or large particles can be used. For faster reaction rates and easier handling, however, it is preferred that this reagent be of a particle size having its major dimension not greater than about 1/8″ and preferably below 500 microns in average particle size.

The processing is subject to considerable variation and quite simplified. For instance, all that is basically required is to bring the reagents into contact with heating, if desired, to enhance the reaction rate. In those instances wherein the alkali metal organo Group II–B metal compound is normally solid under the reaction conditions, a solvent can be employed. The organo Group II–B metal product is then employable as obtained in the reaction system. In essentially all embodiments, the by-product alkali metal compound can be recovered from the reaction system by filtration. Even further purification of the principal product, especially after filtration of the by-product, can be accomplished by conventional techniques, such as distillation, to separate the organo Group II–B product from the solvent, if desired. Other variations of the processing will now be evident.

The present invention will be more readily understood from the following examples wherein all parts are by weight unless otherwise specified.

*Example I*

To a reactor equipped with an external heating means, internal agitation, a means for maintaining an inert atmosphere, and a means for adding and transferring reactants and products is added 35 parts of sodium triethyl zinc dissolved in 200 parts of the dimethyl ether of diethylene glycol. Then, 13.6 parts of finely divided zinc chloride having a particle size less than 1/8″ is added to the reactor. Reaction commences upon addition of the zinc chloride with slight warming occurring. The mixture is heated to 80° C. and maintained at this temperature for 1 hour. The reaction mixture is then filtered to remove solids. In this manner, diethyl zinc in solution in the dimethyl ether of diethylene glycol is obtained in high yield.

When the above example is repeated substituting other zinc halides, such as zinc iodide, zinc bromide, and zinc fluoride, equally good results are obtained. Likewise, when the reaction is conducted in the absence of the ether solvent with all other conditions the same, diethyl zinc is produced in good yield.

*Example II*

Employing the reactor of Example I, there is added thereto 70 parts of sodium triethyl zinc dissolved in 400 parts of the diethyl ether of diethylene glycol. Then 27 parts of finely divided zinc oxide are added to the reaction mixture and the mixture slowly heated to a temperature of 100° C. and maintained at this temperature for 3 hours. After filtration of solids from the reaction mixture, a solution of diethyl zinc in the diethyl ether of diethylene glycol remains.

Similar results are obtained when cadmium oxide is substituted in the above example for zinc oxide and sodium triethyl cadmium is substituted for sodium triethyl zinc.

*Example III*

When essentially 2 moles of potassium tributyl zinc are reacted with essentially 1 mole of zinc acetate employing 10 moles of tetrahydrofuran as a solvent and maintaining the reaction temperature at 60° C. for 2 hours, essentially 3 moles of di-n-butyl zinc are obtained.

When the above example is repeated substituting zinc formate, zinc oxalate, zinc salicylate, zinc stearate, zinc oleate, zinc phenolate, and the like zinc salts of organic acids, good results are also obtained.

*Example IV*

In this run, lithium tri-n-propyl zinc is reacted with dehydrated zinc arsenate in molar proportions of a ratio of 6:1, respectively, employing pyridine as a solvent with the reaction temperature at 100° C. for 4 hours. Di-n-propyl zinc dissolved in pyridine is obtained in good yield after filtration of the mixture to remove the solids.

Similar results are obtained when the above example is repeated substituting other complex inorganic zinc salts, such as zinc bromate, zinc carbonate, zinc chromate, zinc nitrate, zinc phosphate, and zinc silicate, in equivalent amount for zinc arsenate.

*Example V*

An essentially quantitative yield of diethyl zinc is obtained when zinc sulfate is reacted with sodium triethyl zinc in a ratio of 1:2 moles, respectively, employing the dimethyl ether of diethylene glycol as the reaction solvent and operating at the reflux temperature for one hour. Upon filtration of the reaction mixture to remove the by-product sodium sulfate, an essentially pure solution of diethyl zinc in the dimethyl ether of diethylene glycol is obtained.

*Example VI*

Di-3-hexenyl zinc dissolved in trimethyl amine is produced when reacting 4 moles of rubidium tri-3-hexenyl zinc with 2 moles of zinc sulfide in the presence of trimethyl amine at 50° C. for 2 hours.

When the above example is repeated substituting sodium tri-3-butenyl zinc, potassium tricyclohexenyl zinc, lithium triallyl zinc and the like alkali metal trialkenyl zinc compounds for rubidium tri-3-hexenyl zinc, similar results are obtained.

*Example VII*

Sodium tri-5-hexynyl zinc is reacted with zinc bromide in benzene at the reflux temperature in an essentially 2:1 ratio, respectively, for 3 hours. Di-5-hexynyl zinc is obtained in good yield.

When one substitutes lithium tri-1-heptynyl zinc, potassium tripropynyl zinc, sodium tri-7-octynyl zinc and the like alkali metal trialkynyl zinc compounds for sodium tri-5-hexynyl zinc in the above example, equally good results are obtained toward the formation of the corresponding dialkynyl zinc compounds.

*Example VIII*

Essentially 2 moles of sodium tri-2-phenylethyl zinc are reacted with 1 mole of zinc naphthenate in dioxane at 100° C. for 2 hours. Upon cooling the reaction mixture to room temperature and filtering, di-2-phenylethyl zinc is obtained in good yield.

When this example is repeated substituting sodium tribenzyl zinc, sodium tritolyl zinc, potassium trinaphthyl zinc, or sodium triphenyl zinc, for the sodium tri-2-phenylethyl zinc, the corresponding diaryl zinc compounds are obtained.

Similarly, when any of the above examples are repeated employing as a solvent other hydrocarbons, such as hexane, octane, nonane, kerosene, toluene, and the like; other ethers, such as diethyl ether, diamyl ether, tetrahydropyran, ethyl methyl ether of diethylene glycol; and amines, such as aniline, propyl amine, dimethyl amine, quinuclidine, ethylene diamine, dimethyl aniline, and the like for the solvents employed therein, good results are obtained.

*Example IX*

To a reactor is added essentially 2 moles of sodium triethyl cadmium dissolved in 10 moles of the dimethyl ether of diethylene glycol. Then, essentially 1 mole of cadmium sulfide of particle size less than 1/16″ major dimension is added to the reactor and the mixture maintained at 100° C. for 2 hours. Diethyl cadmium is produced.

In place of sodium triethyl cadmium, one can employ sodium tributyl cadmium, potassium tricyclohexenyl cadmium, lithium triphenyl cadmium, and the like, and in place of cadmium sulfide one can employ, for example, cadmium acetate, cadmium bromide, cadmium chloride, cadmium nitrate, cadmium sulfate, and the like inorganic cadmium compounds.

While in preferable embodiments of the invention the alkali metal organo Group II–B metal compound employed is of the same Group II–B metal as the metal of the Group II–B metal salt reactant, the following example will illustrate that embodiment wherein these metals are different.

*Example X*

Employing the procedure of Example I as described with exception that in place of zinc dichloride, cadmium dichloride is employed in equivalent amount, a mixture of essentially 2 moles of diethyl zinc and 1 mole of diethyl cadmium is produced in good yield. If desired, the products can be separated by distillation, preferably under vacuum.

The above examples are presented by way of illustration and it is not intended to be limited thereto. It will now be evident that other alkali metal organo Group II–B metal compounds, Group II–B metal salt compounds, reaction conditions, and solvents, as described herein, can be employed to produce satisfactory results.

The temperature at which the reaction is conducted is subject to considerable latitude as between about 0° C. up to the decomposition temperature of the reactants or products, but preferably below 200° C. The reaction is generally quite rapid. However, some advantage is obtained in greater reaction rate and yield per unit time when conducting the reaction at temperatures between 60 to 120° C. Therefore, this temperature range comprises a particularly preferred embodiment.

Ordinarily, atmospheric pressure is employed in conducting the process. In those instances where it is desirable to employ a lower boiling solvent at temperatures above its boiling point, it is preferable to employ pressure operations. Thus, pressure can be employed to maintain a liquid reaction system. For these purposes, pressures up to about 5000 p.s.i. can be employed although a practical range is up to about 500 p.s.i. If desired, reduced or sub-atmospheric pressures can be employed by reaction under vacuum in order to continuously distill the organo Group II–B product from the reaction system as formed.

While such are not required, particularly where the alkali metal organo Group II–G compound is liquid under the reaction conditions, some advantage is achieved when the reaction is conducted in the further presence of a liquid organic diluent. Such diluents are preferably essentially inert in the reaction with exception that those that will complex with the product or reactants can be employed since they will not hinder the desired result. Further criteria of such solvents are that they be liquid under the reaction conditions and preferably readily recoverable from the reaction system. Among the solvents which can be employed are included, for example, the hydrocarbons, ethers, and amines. Among the hydrocarbons which can be employed are included the various alkanes, alkenes, cyclanes, cyclenes and aromatic compounds, including the mononuclear aromatic compounds, polynuclear non-fused ring and polynuclear fused ring aromatic compounds. Typical examples of the alkanes which are employed include heptane, octane, nonane, up to and including about octadecane and the like, and their various branched chain isomers. Among the alkenes are included, for example, heptylene, octylene, and the like, up to and including about octadecylene and their various branched chain isomers. When the cyclanes are employed as diluents, they can be, for example, cycloheptane, cyclooctane, methylcyclohexane, and the like. Typical examples of the cyclenes include cycloheptene, cyclooctene, 1-methylcyclohexene-1, and the like. Similarly, various polycyclanes and cyclenes are employed as, for example, cyclopentylcyclopentane; cyclohexylcyclohexane; decahydronaphthalene; and the like. Typical examples of mononuclear aromatic compounds include toluene, ethylbenzene, the xylenes, 1,2-diethylbenzene, cyclopropylbenzene, the cymenes, and the like. When the diluents are polynuclear non-fused aromatic compounds, they can be, for example, 1-methyl-2-phenylbenzene; 1,3-diphenylpropane; and the like. When polynuclear fused ring aromatic compounds are employed they can be, for example, indane; 1-methylindane; indene; tetralin; 1,2-dihydronaphthalene; and the like. Generally speaking, the ethers can be non-aromatic, aromatic, and polyethers. The non-aromatic ethers include the monoaliphatic and mixed ethers. Typical examples of the monoaliphatic ethers which are employed are di-n-butyl ether; di-sec-butyl ether; diisobutyl ether; di-n-amyl ether; di-n-heptyl ether; and the like saturated and unsaturated ethers. Examples of the mixed ethers which are employed are n-amylmethyl ether; tert-amylethyl ether; n-butylisopropyl ether; and the like. The aromatic ethers include, for example, the mono aromatic ethers, alkyl aryl ethers, and the alkaryl alkyl ethers. Typical examples of the mono aromatic ethers include dibenzyl ether; diphenyl ether; and the like. When the aromatic ether is an alkyl aryl ether, one can employ, for example, methylphenyl ether; methyl-o, m, or p-tolyl ether; ethyl-o, m, or p-tolyl ether; phenyl-n-propyl ether; isopropylphenyl ether; isoamyl-n-naphthyl ether; and the like. Cyclic ethers are also employable as, for example, tetrahydrofuran, tetrahydropyran, dioxolane, and the like. The alkaryl alkyl ethers which are employed can be, for example, benzylmethyl ether, benzyl-n-butyl ether; and the like. Examples of the polyethers which are employed are those having the configuration R—O—(CH$_2$)$_n$—O—R wherein R is an organic radical, preferably hydrocarbon or ether radicals having up to about 4 carbon atoms each, and $n$ is a small whole number as between about 1 to 10, preferably 1 to 3 inclusive. For example, such polyethers include ethylene glycol ethyl methyl ether, the diethyl ether of ethylene glycol; methyl-n-propyl ether of ethylene glycol; 1,4-dioxane; tetraethylene glycol dimethyl ether; glycerol trimethyl ether; dimethyl ether of diethylene glycol; dimethoxyethane; diethyl ether of diethylene glycol; and the like. Other polyethers which can be employed include, for example, pyrocatechol dimethyl ether; 1,2,4-trimethoxybenzene, and the like. Included among the amines are the primary, secondary, tertiary and heterocyclic amines as, for example, ethyl amine, propyl amine, diethyl amine, dipropyl amine, dicyclohexyl amine, diphenyl amine, triphenyl amine, triethyl amine, myristyl diethyl amine, pyridine, cyclohexylamine, dimethylaniline, ethylene diamine, quinuclidine, aniline, tribenzyl amine, trivinyl amine, and the like. In general, the hydrocarbon portions of such diluents will have up to about 20 carbon atoms. Such solvents can, of course, contain other substituents which are essentially non-reactive in the system and will not hinder the principal reaction desired. The ethers comprise especially preferred reaction media, particularly the polyethers and cyclic ethers, since higher yields are obtained when such are employed. Likewise, the ethers more readily complex with alkali metal organo Group II–B compounds providing reagents which are in solution and more readily adaptable to further use than the uncomplexed alkali metal organo Group II–B compounds. Of the ethers, the dialkyl ethers of ethylene and diethylene glycol wherein the alkyl groups contain up to about 6 carbon atoms are particularly preferred. Among such ethers, the dimethyl ether of diethylene glycol and the dimethyl ether of ethylene glycol are particularly advantageous.

While the above discussion of solvents has been confined to the hydrocarbons, ethers, and amines with the ethers being preferred, other solvents are employable such as other Lewis bases which are essentially inert in the reaction mixture in the sense that they do not degrade the reactants or products. Such Lewis bases of the type described by Noller in "Chemistry of Organic Compounds," W. B. Saunders Co., 1951, at page 234, and the article by Stone in "Chemical Review," vol. 58, 1958, at page 101 can be employed.

The proportion of solvent which is employed is subject to considerable latitude. In general, between about 1 to 100 parts per part by weight of the alkali metal organo Group II–B compound are employed. In those instances wherein a complex of the solvent with the product is achieved and it is desirable to employ the product as its complex, the solvent is used in amount at least sufficient to obtain one molecule of the solvent complexed with one molecule of the organo Group II–B product.

It is not necessary to recover the product from the reaction system since it can be employed as obtained. However, the usual recovery techniques are possible as, for example, filtration of the reaction mixture to remove the by-product alkali metal salt, or oxide, as the case may be. If desired, the product can generally be continuously distilled from the reaction mixture as, for example, by drawing a vacuum on the system during the course of the reaction, operating above the boiling point of the product when the reactants and by-products are higher boiling, or operating at reduced pressures sufficient to distill the product along with solvent, if desired, from the system. Thus, it is quite apparent that continuous processing is readily obtained by continuously feeding the reactants with solvent to a reactor while simultaneously distilling the product from the reaction system. Other modifications of the processing involved will now be evident.

The novel process of the present invention is particularly well suited for integration with techniques for making the alkali metal organo Group II–B metal compound, especially wherein the organo groups are derivable from olefinic compounds. By way of example, the alkali metal organo Group II–B compound can be prepared by reaction of a complex of an alkali metal hydride and an organo Group II–B metal compound, more appropriately termed an alkali metal organo Group II–B metal hydride, wherein said metal has an atomic number between 30 and 48 inclusive, with an olefin. Such complexes wherein the alkali metal hydride is sodium hydride and the organo Group II–B metal compound is a dialkyl zinc compound in the proportions of essentially 1 mole of the former to 2 moles of the latter, particularly the complex sodium diethyl zinc hydride (NaH·2ZnEt$_2$), are especially preferred. Of the olefins, the alpha-olefins having from 2 to 6 carbon atoms, particularly in a straight chain, have been found most suitable. For best results, the reaction of the alkali metal organo Group II–B hydride with the olefin is generally conducted at a temperature between about 60 to 120° C., although higher or lower temperatures are employable, employing at least one mole of the olefin per mole of hydrogen bonding in the alkali metal organo Group II–B metal hydride complex. Advantage is also obtained in greater yields and reaction rate by the employment of Lewis base solvents as described above, such as the polyethers, particularly the dimethyl ether of diethylene glycol. If the olefin is normally gaseous under the reaction conditions, appropriate pressure between about 100 to 500 p.s.i. and higher can be used. Thus, a particular embodiment of this invention comprises the reaction of the complex of sodium hydride with diethyl zinc (sodium diethyl zinc hydride, and especially NaH·2ZnEt$_2$) with ethylene at a temperature between about 60 to 120° C. in the presence of the dimethyl ether of diethylene glycol to produce sodium triethyl zinc which in turn is reacted with zinc chloride as described hereinbefore without intermediate separations or changing conditions. Generally, in addition to the formation of the alkali metal triorgano Group II–B metal compound, when reacting the alkali metal organo Group II–B hydride with the olefin, a by-product organo Group II–B metal compound is obtained. This by-product is readily recycled for reaction with additional alkali metal hydride, either in situ or externally, to form the alkali metal organo Group II–B hydride complex starting material.

The above processing can be still further integrated with a step for the preparation of the alkali metal organo Group II–B metal hydride by the reaction of an alkali metal hydride with an organo Group II–B metal compound wherein the metal has an atomic number between 30 and 48 inclusive in the presence of a reaction promoting solvent, such as the Lewis bases described hereinbefore, especially a cyclic ether or a polyether. Of the alkali metal hydrides, sodium hydride is especially preferred because of its greater availability, ease of formation, and reactivity. Of the organo Group II–B metal compounds, the dialkyl zinc compounds have been found most applicable and are thus preferred. Additionally, the lower alkyl ethers of diethylene glycol, especially the dimethyl ether of diethylene glycol, have been found to be most advantageous reaction promoting solvents in the process. A particularly preferred operating temperature is that between about 25 to 100° C. Thus, in an especially unique embodiment, a complex of one mole of sodium hydride with 2 moles of diethyl zinc (more simply termed "sodium diethyl zinc hydride") is obtained by reacting sodium hydride with diethyl zinc in essentially the stoichiometric proportions of 1:2 moles, respectively, in the presence of the dimethyl ether of diethylene glycol at a temperature between about 25 to 100° C. The complex so-formed can then be reacted with the olefin as described above to form, as the principal product, the alkali metal organo Group II–B compound which, in turn, is reacted with the Group II–B salt. Alternatively, the alkali metal hydride, organo Group II–B metal compound, and olefin can be simultaneously reacted, especially in the reaction promoting Lewis base solvents, to produce the alkali metal triorgano Group II–B metal compound as the principal product.

Thus, the novel process of the present invention can be advantageously integrated with steps for forming the alkali metal organo Group II–B metal hydride, reaction of the latter with an olefin to form the alkali metal triorgano Group II–B metal compound, and then reaction with the inorganic Group II–B metal salt to form the desired diorgano Group II–B metal compound in high yield and purity in the same solvent system and at the same temperatures of preferably 60 to 120° C. without any recoveries, separations, or complicated processing required when conducting the steps separately. Additionally, greater throughput per unit time is thereby possible.

To illustrate one variation of integrated processing, the following example is presented.

*Example XI*

To the reactor employed in Example I was added 45 parts dimethoxyethane and 11.8 parts of diethyl zinc. Then, 1.2 parts of sodium hydride were added thereto and the mixture heated to reflux temperature and maintained at these conditions for 6 hours. In this manner, a solution of sodium diethyl zinc hydride complex

(NaH·2Zn(C$_2$H$_5$)$_2$)

in the ether was obtained in essentially quantitative yield. The complex so prepared in the dimethoxyethane, 13.3 parts, was left in the reactor. The reactor was then pressurized with ethylene to 400 p.s.i. and the temperature was increased gradually from 25° C. to 109° C. over a period of 2 hours while maintaining the ethylene pressure in the reactor from 400 to 470 p.s.i.g. during this period. During the course of the reaction, it was found that a pressure drop of 180 p.s.i.g. was obtained and thus an equivalent amount of ethylene was pressurized into the system. Without separations, 7.1 parts of zinc chloride are added to the reactor and reaction continued essentially as described in Example I. In this manner, diethyl zinc is obtained in good yield.

*Example XII*

The procedure of Example XI is repeated essentially as described with exception that at the completion of the formation of the sodium diethyl zinc hydride complex (NaH·2Zn(C$_2$H$_5$)$_2$), an equimolar amount of sodium hydride (1.2 parts) is added to the reactor and then the system pressurized with ethylene as described at the same temperature and pressure conditions. Sodium hydride is then incrementally added in amount sufficient to consume essentially all the diethyl zinc by-product as it forms. In this manner, sodium triethyl zinc is produced in essentially quantitative yield with minimal by-product formation of diethyl zinc. To the reactor consisting essentially of the sodium triethyl zinc in the ether solvent is then added 14 parts of zinc chloride while maintaining the same temperature to produce diethyl zinc and sodium chloride as essentially the sole products of the reaction mixture.

It will now be evident that other modifications can be made to accomplish similar integrated processing for producing the organo Group II–B metal product.

The organo Group II–B metal products produced are of considerable utility. For example, many of the products have been known for quite some time as useful in the formation of other organometallic compounds. In particular, the organozinc or cadmium compounds, e.g. diethyl zinc, can be reacted with metal salts, such as lead chloride, to produce the corresponding organometallic compounds, specifically tetraethyllead. The novel products are also considerably useful in the formulation of catalysts for the polymerization of various olefins, especially the alpha-olefins at temperatures between about 0 to 150° C. and suitable pressures as up to about 5000 p.s.i. Generally, these compounds are employed in conjunction with refractory metal salts, especially the Group IV–B metal halides, such as titanium tetrachloride. When employed in such catalyst formulations, the resulting polymers are of the high melting and high crystallinity type. Other uses for the organo Group II–B metal compounds will now be evident.

Having thus described the novel process, it is not intended that it be limited except as set forth in the following claims.

We claim:
1. The process for the production of hydrocarbon Group II–B metal compounds which comprises reacting an alkali metal tri-hydrocarbon Group II–B metal compound with a Group II–B metal salt wherein said Group II–B metals have an atomic number of 30 to 48 inclusive, wherein the Group II–B metal of the alkali metal hydrocarbon Group II–B metal compound is the same as the Group II–B metal of the Group II–B metal salt.

2. The process for the manufacture of a dialkyl zinc compound which comprises reacting an alkali metal trialkyl zinc compound with a zinc halide at a temperature between about 60 to 120° C.

3. The process of claim 2 wherein the reaction is conducted in the presence of an essentially inert solvent.

4. The process for the manufacture of diethyl zinc which comprises reacting essentially 2 moles of sodium triethyl zinc, with 1 mole of zinc chloride in the presence of the dimethyl ether of diethylene glycol at a temperature between about 60 to 120° C.

5. The process of claim 1 wherein the Group II–B metal is zinc.

6. The process of claim 1 wherein the Group II–B metal is cadmium.

7. The process of claim 1 wherin the hydrocarbon radical is the ethyl radical.

8. The process of claim 1 wherein the alkali metal is sodium.

9. The process of claim 1 wherein the metal salt is a metal halide.

10. The process of claim 1 wherein the metal salt is selected from the group consisting of metal sulfides and metal oxides.

11. The process of claim 1 wherein the metal salt is a salt of an organic acid.

12. The process of claim 1 wherein the hydrocarbon radical is an unsaturated radical.

13. The process of claim 1 wherein the hydrocarbon radical contains ethylenic unsaturation only.

14. The process of claim 1 wherein the hydrocarbon radical contains acetylenic unsaturation only.

15. The process of claim 1 wherein the hydrocarbon radical is an aryl radical.

16. The process of claim 2 wherein the reaction is conducted in the presence, as a solvent, of the dimethyl ether of diethylene glycol.

References Cited by the Examiner
UNITED STATES PATENTS

| | | | |
|---|---|---|---|
| 2,794,819 | 6/57 | Smith | 260—448 |
| 2,969,381 | 1/61 | Blitzer et al. | 260—429.9 |
| 2,989,557 | 6/61 | Blitzer et al. | 260—429.9 |

TOBIAS E. LEVOW, *Primary Examiner.*

DANIEL D. HORWITZ, *Examiner.*